United States Patent

Koivunen

[15] 3,645,172
[45] Feb. 29, 1972

[54] VARIABLE DISPLACEMENT FLUID PUMP MOTOR

[72] Inventor: Erkki A. Koivunen, Livonia, Mich.

[73] Assignee: General Motors Corporation, Detroit, Mich.

[22] Filed: June 4, 1970

[21] Appl. No.: 43,334

[52] U.S. Cl. ...................................................91/497, 91/493
[51] Int. Cl. ..................................................F01b 13/04
[58] Field of Search ............................91/490, 491, 494, 495, 497;
92/12.1; 417/270

[56] References Cited

UNITED STATES PATENTS

| 1,852,335 | 4/1932 | Rosen | 91/497 |
| 2,990,781 | 7/1961 | Tuck et al. | 417/270 |
| 3,274,946 | 9/1966 | Simmons | 91/490 |
| 3,036,557 | 5/1962 | Kimsey | 91/490 |
| 3,019,738 | 2/1962 | Zubaty | 92/12.1 |
| 3,125,034 | 3/1964 | Lucien et al. | 91/490 |

Primary Examiner—William L. Freeh
Attorney—W. E. Finken, A. M. Heiter and D. F. Scherer

[57] ABSTRACT

A fluid translating device such as a fluid pump or motor having an outer rotatable ring providing a power input or output member to which a plurality of inwardly extending pistons are secured. The pistons are slidably disposed in cylinders which are freely mounted on a stationary spindle. Fluid is ported to and from a fluid chamber formed by the pistons and cylinders through the spindle, the inner ring and the cylinders. A displacement control mechanism controls the position of the inner ring on the spindle so the inner ring is positioned eccentrically relative to the outer ring whereby the fluid chambers are expansible as the inner and outer rings rotate. The outer ring may be secured to a mechanical member which provides an output drive such as a vehicle wheel or may be driven by a mechanical input such as a motor.

3 Claims, 5 Drawing Figures

INVENTOR.
Erkki A. Koivunen
BY Donald F. Scherer
ATTORNEY

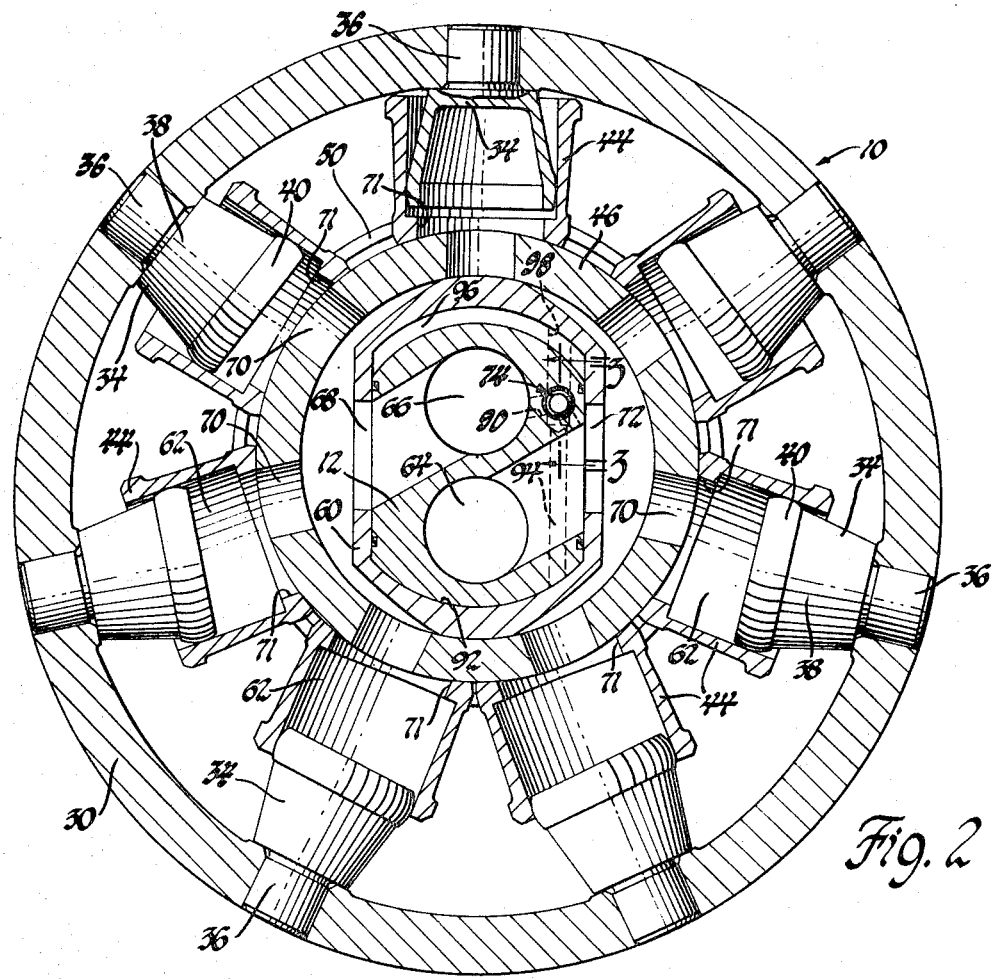
Fig. 2
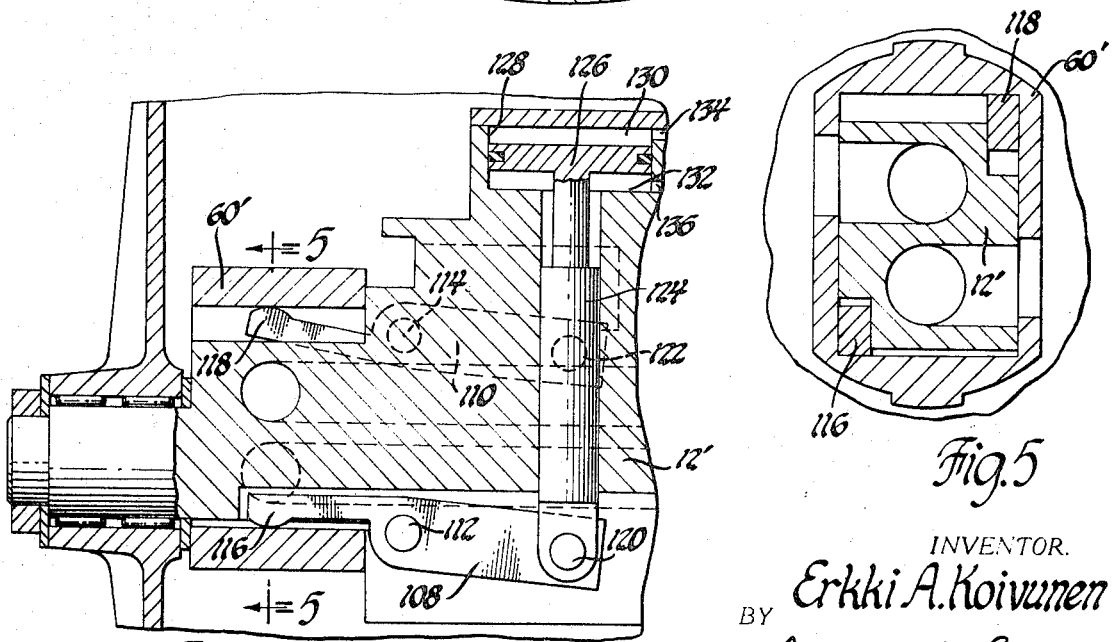
Fig. 4
Fig. 5
INVENTOR.
Erkki A. Koivunen
BY Donald F. Scherer
ATTORNEY

VARIABLE DISPLACEMENT FLUID PUMP MOTOR

This invention relates to fluid translating devices and more particularly to variable displacement radial piston pumps and motors. The present invention is used to translate fluid power to mechanical power or vice versa. In the preferred embodiment the invention is used as a fluid motor mounted integrally with a driving wheel. The driving wheel is rotatably supported on a nonrotatable spindle or pintle member which provides fluid communication to and from the device. An inner ring is rotatably mounted on the spindle and supports a plurality of cylinder members which are slidably engaged by pistons secured to an outer ring. The outer ring is secured to the vehicle wheel to provide a drive thereto. As fluid pressure is admitted through the spindle, the fluid passes through the inner ring and the cylinders to act upon the pistons to cause the pistons to drive the outer ring and thereby drive the vehicle wheel. A yoke drive is provided between the inner and outer rings to maintain correct timing relationship between these two rings.

A displacement control member is operable between the inner ring and the spindle to vary the eccentricity between the inner and outer ring. The amount of eccentricity between the two rings determines the torque capacity of the motor or the flow capacity of the pump. This eccentricity may be controlled mechanically through a lever system or it may be controlled hydraulically by admitting fluid pressure between the spindle and the displacement control member thereby positioning the inner ring for more or less eccentricity as desired. A valve member is positioned in the spindle when it is desirable to have fluid control of the displacement control member. This valve member responds to fluid pressure in the system to provide a large eccentricity, when the system fluid pressure is high, thus providing a high output torque from the fluid motor and provides a low eccentricity when the system pressure is low to provide a high-speed low torque motor. These two torque conditions are particularly desirable in wheel drives since at startup it is desirable to have maximum torque output for vehicle acceleration and at highway speeds or highway operation, it is desirable to have high speed low torque to provide maximum vehicle speed.

It is, therefore, an object of this invention to provide in an improved fluid translating device an outer rotatable ring having pistons secured thereto and extending radially inwardly therefrom engaging a plurality of cylinder members and cooperating therewith to form fluid chambers. The cylinder members are mounted on a rotatable ring which is movable to control the volume of the fluid chambers between the pistons and cylinders.

It is another object of this invention to provide in an improved fluid translating device, such as a fluid motor, an outer rotatable ring adapted to drive an output member and a plurality of pistons extending radially inward from the ring and cooperating with a plurality of cylinders to form expansible fluid chambers. The cylinders are freely mounted on an inner rotatable ring which is drivingly connected to the outer rotatable ring and is also movable to various positions causing eccentricity between the inner and outer ring to control the volume and torque capacity of the fluid translating device.

It is another object of this invention to provide in an improved variable displacement fluid translating device having an outer ring with a plurality of pistons secured thereto and extending inwardly therefrom and engaging a plurality of cylinder members to provide fluid chambers, an inner ring movable to eccentric positions to control the displacement of said expansible chambers and a valve mechanism for controlling high eccentricity at high fluid pressures and low eccentricity at low fluid pressures.

These and other objects and advantages of the present invention will be more apparent from the following description and drawings in which:

FIG. 2 is a cross-sectional view taken along line 2—2 of FIG. 1;

FIG. 4 is a sectional view showing another embodiment of the displacement control; and FIG. 5 is a sectional view showing the displacement control taken along line 5—5 of FIG. 4.

Figure 1:
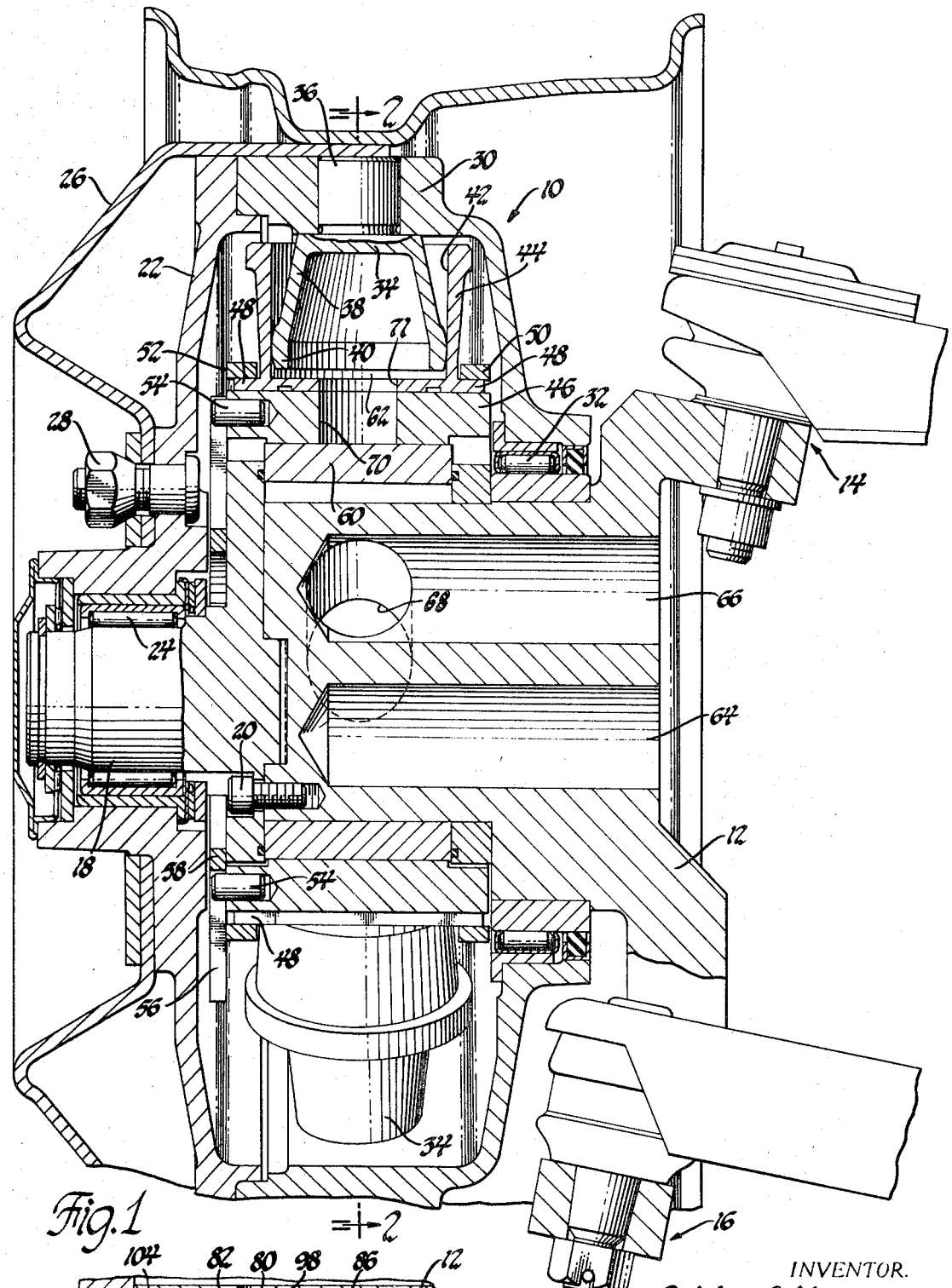
FIG. 1 is a side elevational view partly in section of the fluid device.
Figure 3:
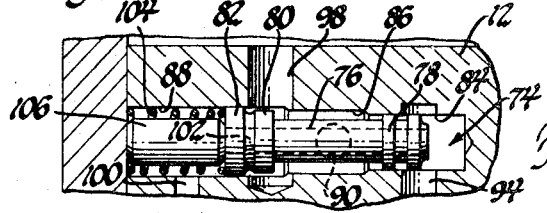
FIG. 3 is a partial sectional view taken along line 3—3 of FIG. 2.

Referring to the drawings, particularly FIGS. 1 and 2, there is shown a fluid motor 10 having a spindle or pintle member 12 secured to the vehicle suspension 14 and 16. A hub member 18 is secured to the spindle 12 by a plurality of fasteners such as screws 20. The hub member 18 rotatably supports a hub 22 on needle bearings 24. The hub 22 is secured to a wheel rim 26 by a plurality of fasteners such as 28 and to an outer ring or drum 30 which is rotatably supported on the spindle 12 by a needle bearing or roller bearing 32. The ring 30 has secured thereto a plurality of pistons 34 having a cylindrical portion 36, a conical portion 38 depending from the cylindrical portion 36 and a spherical portion 40. The spherical portion 40 extends within the slidably engages the inner wall 42 of a cylinder 44 which is slidably mounted on an inner ring 46. The spherical portion 40 provides line contact between the piston 34 and the cylinder 44 to reduce the friction between the piston 34 and the cylinder 44 and to also reduce the hydraulic unbalance forces which can occur between these two members. The cylinders 44 have flange portions 48 which contact a pair of positioning rings 50 and 52. These rings prevent substantial separation between the cylinders 44 and the inner ring 46 to prevent excessive leakage between the cylinder 44 and the ring 46. The ring 46 has pressed therein a pair of pins 54 which engage slots 56 in a drive plate 58. The hub 22 also has a pair of pins secured thereto at 90° from the pins 54 and not shown in the drawing which engage slots similar to the slot 56 in the drive plate 58. The pins, slots and plate 58 cooperate to provide a drive connection between the outer ring 30 and the inner ring 46. This drive connection maintains proper timing between the inner and outer rings. The drive force required is determined by the amount of friction between the inner ring 46 and a displacement control member 60.

The displacement control member 60 is slidably disposed on the spindle 12 and is movable thereon to control the eccentricity between the inner ring 46 and the outer ring 30. The amount of eccentricity produced by the displacement control 60 determines the volumetric displacement of fluid chambers 62 that are formed between the piston 34 and the cylinder 44. It is well known with fluid pumps and motors that the amount of fluid delivered by a pump or the torque capacity of a motor is proportional to the displacement of the pump or motor. As shown in FIG. 2, the fluid translating device is at its maximum displacement such that maximum torque output for a given pressure will be delivered to the rim 26.

Fluid is transmitted to and from the fluid translating device 10 through a pair of passages 64 and 66 which are located in the spindle 12. The passage 66 is in fluid communication to an opening 68 in the displacement control member 60 and a plurality of openings 70 in the inner ring 46 to the fluid chambers 62 through elongated openings 71 in the cylinders 44. The passage 64 is in fluid communication through an opening 72 in the displacement control member 60 and openings 70 to the chambers 62. The openings 70 alternate between communication with opening 68 and 72 as the inner ring is rotated about the displacement control member 60 and the spindle 12. In the position shown in FIG. 2, if fluid pressure is admitted to passage 66, fluid pressure will communicate through openings 70 to the chambers 62 from the left-hand side of displacement control member 60 thereby causing counterclockwise rotation of the outer ring 30. As the outer ring 30 rotates, the chambers 62 expand for half a revolution and then the chambers begin to contract. As the chambers contract, the fluid therein is directed through the openings 70 and the openings 72 to the passage 64 where the fluid is exhausted from the device 10. This will be considered the forward direction of rotation. If the fluid pressure is admitted to passage 64 it enters the chambers 62 on the right-hand side of the displacement control member 60 to cause clockwise rotation of the outer ring 30. Thus when pressure is admitted at passage 66, the rim 26 will be driven forwardly and when pressure is admitted at passage 64 the rim 26 will be driven in reverse. It should be noted that as the outer ring 30 and the inner ring 46 rotate the cylinders 44 move relative to the inner ring 46. The elongated openings 71 maintain fluid communication between chambers 62 and openings 70 during this relative movement.

A control valve 74 is also disposed in the spindle 12 and includes a valve spool 76 having a small diameter land 78, an intermediate diameter land 80 and a large diameter land 82 slidably disposed in valve bores 84, 86 and 88 respectively. The valve bore 86 is in fluid communication with passage 66 via a passage 90, the bore 84 is in fluid communication with a chamber 92 between the displacement control member 60 and the spindle 12 through a passage 94, and the valve bore 88 is in fluid communication with a chamber 96 via a passage 98 and with passage 64 via a passage 100. A central passage 102 in valve spool 76 connects the opposite end of the valve spool with the passage 100. A spring member 104 compressed between the end of valve bore 88 and the land 82 provides a spring bias that urges the valve spool 76 to the right. A stop member 106 prevents excessive movement of the valve spool 76 to the left when pressure is acting on the surfaces of the valve lands. In the position shown, the passage 90 communicates pressure from main passage 66 to passage 98 and chamber 96 to position the displacement control member 60 in the position shown in FIG. 2 and provides maximum displacement in the fluid translating unit 10. In this position, the fluid in chamber 92 is exhausted through passages 94, 102 and 100 to the discharge passage 64. If the pressure in passage 66 is not sufficiently high to overcome the force in spring 104, when acting on the end face of valve land 80, the valve spool 76 will move to the right under the force of spring 104 to provide fluid communication between passage 90 and passage 94 so that chamber 92 will be pressurized to cause the displacement control member 60 to move downward as viewed in FIG. 2 to establish the minimum displacement in the device 10. As the valve spool 76 moves to the right, the passage 94 will be disconnected from the right end of the valve spool 76 while the passage 98 is connected with the passage 100 at the left end of valve spool 76. This permits the fluid in chamber 96 to be exhausted so that the displacement control member can be moved. In the position shown, the fluid pressure in passage 90 acts on the differential area between the lands 78 and 80 and the differential area between the lands 80 and 82. However, when the valve 74 is in the spring set position, the land 88 is slidably disposed in the bore 86 so that the fluid pressure in passage 90 does not contact the differential area between lands 80 and 82. Thus to open the valve to the position shown, the fluid pressure in passage 90 acting on the differential area between lands 78 and 80 must be sufficient to overcome the spring 84. However, once the valve spool is moved to the left, the pressure in passage 90 will act on the total differential area between lands 78 and 82 to provide a hysteresis between the opened and closed positions. When the device 10 is operated in reverse, such that passage 64 is pressurized, the fluid pressure in passage 64 is directed through passage 100 to the left end of valve spool 76 and via passage 98 to the chamber 96. In reverse, the valve spool 76 cannot be shifted since the pressure bias and the spring bias act in the same direction therefore the fluid translating device 10 will remain at maximum displacement during reverse operation.

The displacement control shown in FIG. 4 includes a pair of levers 108 and 110 pivotally mounted on pins 112 and 114 secured to the spindle 12'. The ends 116 and 118 of the levers 108 and 110 respectively engage the displacement control member 60'. The levers 108 and 110 are also connected to pins 120 to 122 respectively with a piston rod 124 which is secured to a piston member 126. The piston 126 is slidably disposed in a cylinder 128 which is divided into two fluid chambers 130 and 132 by the piston 126. Fluid pressure is admitted to chamber 130 via passage 134 and to chamber 132 via passage 136. The passages 134 and 136 may be supplied with a fluid from a valve similar to valve 74 or via a conventional directional control valve. When fluid pressure is admitted to chamber 130, the piston 126 and piston rod 124 will be moved downward to cause the end 118 of lever 110 to move the displacement control member 60' upward into the maximum displacement position. When the chamber 132 is pressurized, the piston and piston rod 124 will be moved upward so that the end 116 of lever 108 will cause the displacement control member 65 to move downward to establish the minimum displacement of the fluid device 10.

In the above-described preferred embodiment the fluid device 10 is shown as a hydraulic motor. However, this device is also useful as a hydraulic pump. If it is desired to use the device as a hydraulic pump, it is merely necessary to connect the input drive to the hub 22 to thereby rotate the pistons to cause the fluid pressure in chambers 62 to be delivered from the unit to the device desired to be pressurized. When the device is used as a fluid pump, the displacement control member 60 can be moved from the maximum positive displacement to a maximum negative displacement by the displacement control shown in FIG. 4. Thus, if a pump similar in construction to that shown in FIGS. 1 and 2 were used to drive the fluid motor described in the preferred embodiment to provide reverse rotation, the fluid pump could be changed from positive displacement for forward drive to negative displacement for reverse drive.

Obviously many modifications and variations of the present invention are possible in light of the above teachings. It is, therefore, to be understood that within the scope of the appended claims the invention may be practiced otherwise than as specifically described.

What is claimed is:

1. A fluid translating device comprising an outer rotatable ring; a plurality of piston means secured to and extending inwardly from said outer ring; an inner rotatable ring; a plurality of cylinder means slidably abutting on said inner ring and slidably engaging said piston means and cooperating therewith to form expansible fluid chambers; displacement control means rotatably supporting said inner ring and being movable to control an eccentric relationship between said inner and outer rings to thereby control the maximum and minimum volume of the fluid chambers; stationary pintle means slidably supporting said displacement control means and having a pair of fluid passages for delivering fluid to and exhausting fluid from the fluid chambers; a pair of control chambers between said pintle and said displacement control means; and valve means in fluid communication with said pair of passages and said control chambers for selectively communicating fluid with said control chambers for moving said displacement control means on said pintle including a valve spool having a differential area responsive to fluid pressure in one of said passages to direct fluid pressure to one of said control chambers to establish maximum volume when the pressure in said one passage is above a predetermined value and to direct fluid pressure to said other of said control chambers when the fluid pressure is below said value, and a valve land responsive to fluid pressure in said other passage to direct fluid pressure to said one chamber when said other passage is pressurized.

2. A fluid translating device comprising an outer rotatable ring; a plurality of piston means secured to and extending inwardly from said outer ring and having a spherical section; an inner rotatable ring having fluid openings therein, a plurality of cylinder means slidably disposed on said inner ring, slidably engaging said spherical section and cooperating therewith to form expansible fluid chambers each having an elongated opening therein adjacent said fluid openings for maintaining fluid communication between said chambers and said fluid openings during rotation of said rings; inlet and discharge passage means communicating with said inner ring; and displacement control means operatively connected with said inner ring for controlling the axial relationship between said inner and outer rings including valve means having a differential area in fluid communication with said inlet passage means to control the displacement means to maintain a minimum displacement of said fluid chambers during low inlet pressures and maximum displacement during high inlet pressures; and a valve land in fluid communication with said discharge means to control said displacement means to maintain maximum displacement when said discharge passage means is pressurized and said inlet passage means is exhausted.

3. A fluid translating device comprising an outer rotatable ring; a plurality of piston means secured to and extending inwardly from said outer ring and each having a spherical segment portion; an inner rotatable ring; a plurality of cylinder means slidably abutting on said inner ring and slidably engaging said spherical segment portion of said piston means and cooperating therewith to form expansible fluid chambers; displacement control means rotatably supporting said inner ring and being movable to control an eccentric relationship between said inner and outer rings to thereby control the maximum and minimum volume of the fluid chambers; stationary pintle means slidably supporting said displacement control means and having first and second fluid passages for delivering fluid to and exhausting fluid from the fluid chambers; a pair of control chambers between said pintle and said displacement control means; and valve means having a differential area in fluid communication with said first fluid passage and one of said control chambers when the fluid pressure in said first passage is low and with said other control chamber when the pressure in said first passage is high and a land area in fluid communication with said second passage and said other chamber when the fluid pressure in the second passage is higher than pressure in the first passage for selectively communicating fluid with said control chambers for moving said displacement control means on said pintle to control the maximum and minimum volume of the fluid chambers.

* * * * *